United States Patent [19]

Tomimitsu

[11] Patent Number: 5,220,545
[45] Date of Patent: Jun. 15, 1993

[54] DISK CONTROLLER INCLUDING FORMAT CONTROL UNIT INSTRUCTING DIRECTLY JUMP BACK OPERATION

[75] Inventor: Yasuharu Tomimitsu, Tokyo, Japan

[73] Assignee: NEC Corporation, Tokyo, Japan

[21] Appl. No.: 738,225

[22] Filed: Jul. 30, 1991

[30] Foreign Application Priority Data

Jul. 30, 1990 [JP] Japan .................................. 2-201839

[51] Int. Cl.[5] ................................................ G11B 7/00
[52] U.S. Cl. ..................................... 369/32; 369/44.28
[58] Field of Search ........................ 369/32, 48, 58, 59, 369/50, 44.28, 54; 360/72.2, 77.04, 78.04

[56] References Cited

U.S. PATENT DOCUMENTS

| | | | |
|---|---|---|---|
| 4,958,314 | 9/1990 | Imai et al. | 369/32 |
| 4,977,550 | 12/1990 | Furuya et al. | 369/32 |
| 5,012,461 | 3/1991 | Yoshida et al. | 369/32 |
| 5,089,999 | 2/1992 | Ishida et al. | 369/32 |

*Primary Examiner*—Aristotelis Psitos
*Assistant Examiner*—Nabil Hindi
*Attorney, Agent, or Firm*—Whitham & Marhoefer

[57] ABSTRACT

A disk controller for a disk having spirally formed tracks comprises a buffer memory for temporarily storing write data to be recorded on said disk and read data derived from said disk. A first register temporarily stores current sector information representative of a sector currently accessible, the current sector information being changed in accordance with rotation of said disk. A second register temporarily stores target sector information representative of a sector from which a data read/write operation starts. A comparator compares the current sector information with said target sector information to produce a comparison output signal taking an active level when the current sector information coincides with the target sector information. A memory control unit produces a ready signal taking an active level when the write data is stored in the buffer memory or when the buffer memory has a vacancy for accepting the read data. A sequence controller is responsive to the comparison output signal and the ready signal to generate a jump back signal when the ready signal is at an inactive level at a time when the comparison output signal takes the active level. The sequence controller further generates, after the comparison signal takes the active level, the jump back signal when the ready signal is at the inactive level at a time when the current sector information changes.

10 Claims, 6 Drawing Sheets

DISK CONTROLLER INCLUDING FORMAT CONTROL UNIT INSTRUCTING DIRECTLY JUMP BACK OPERATION

BACKGROUND OF THE INVENTION

The present invention relates to a disk controller and, more particularly, to an optical disk controller for an optical disk having a spirally formed track.

An optical disk is employed as one of the data storage units in an information processing system. An optical disk controller performs a data transfer operation between the disk and a host processor.

The optical disk controller includes in general a buffer memory for temporarily storing write data from the host processor and read data from the disk, a format control unit for converting the write data from the buffer memory into data to be recorded on the disk and the data reproduced from the disk into the read data, and a system controller for responding to commands from the host processor to control the data transfer flow. Further included in the disk controller are a servo controller for controlling the focus and tracking of an optical beam on the disk and a drive controller for ordering, under the control of the system controller, the servo controller to perform a seek operation in which the optical beam moves to a target track and a jump operation in which the optical beam jumps to the adjacent track.

When the system controller receives a data transfer command from the host processor, it requests the seek operation of the drive controller, so that the optical beam moves rapidly to the target track. At a time when a target sector on that track is searched, the format controller starts to operate in a data write mode to record the write data from the buffer memory on the disk and in a data read mode to supply the buffer memory with the read data responsive to the data recorded on the disk. In the data write mode, the write data is transferred from the host processor to the buffer memory, and in the data read mode, the read data is transferred from the buffer memory to the host processor. Thus, the data transfer is executed between the disk and the host processor.

However, sometimes in the data write mode no write data has been transferred to the buffer memory at a time the target sector is searched and that the write data transfer to the buffer memory is suspended. Also in the data read mode, the buffer memory is often filled with the read data which are not transferred to the host processor yet. In such cases, the data read/write operation is of course suspended until the write data arrives in the buffer memory or until the buffer memory has a vacancy for accepting the read data. On the other hand, the disk continues to rotate. Since the track on the disk is formed spirally, therefore, the accessible sector advances in sequence, so that the target sector is not searched again even when the write data is transferred to the buffer memory or the vacancy for the read data is formed in the buffer memory.

Therefore, the format controller informs the system controller of a fact that the data read/write operation is suspended due to the above reason. In response thereto, the system controller requests the jump operation of the drive controller to back the optical beam up by one track. To back the optical beam up is called hereinafter "jump back".

However, this jump back operation is performed after the response time of the system controller and the drive controller has elapsed, resulting in lowering in an access speed. Moreover, the system controller must be designed to handle the request from the format controller, and hence the load thereof is made large.

SUMMARY OF THE INVENTION

Therefore, an object of the present invention is to provide an improved disk controller.

Another object of the present invention is to provide a disk controller which can prevent lowering the access speed even when a data read/write operation is suspended.

Still another object of the present invention is to provide a disk controller which can achieve a jump back processing operation without increasing the loading of the system controller.

A disk controller according to the present invention is characterized in that a format control unit generates directly a jump back signal and a servo controller responds directly to that signal to perform a jump back operation.

More specifically, the format control unit comprises a first register for temporarily storing current sector information which indicates a currently accessible sector on a disk and is changed in accordance with the location of the disk, a second register for temporarily storing target sector information indicative of a target sector from which a data read/write operation starts, comparator means for comparing the information stored in the first register with the information stored in the second register to produce a comparison output signal taking an active level when the former information coincides with the latter information, and a sequence controller receiving the comparison output signal and a ready signal which takes an active level when write data is already stored in a buffer memory or when the buffer memory has a vacancy for accepting read data and generating the jump back signal when the ready signal is in an inactive level when the comparison output signal takes the active level, the sequence controller further generating, after the comparison output signal takes the active level, the jump back signal when the ready signal is in the inactive level when the information stored in the first register is changed.

Thus, the format control unit initiates the jump back operation to prevent lowering the access speed due to the delay of system and drive controllers.

When the sequence controller generates the jump back signal, the sector information at that time is temporarily retained, and the comparator means thereafter compares the current sector information with the retained sector information. The generation of the jump back signal is then controlled in response to the comparison output signal and the ready signal.

BRIEF DESCRIPTION OF THE DRAWINGS

The above and other objects, advantages and features of the present invention will be more apparent from the following description taken in conjunction with the accompanying drawings, in which.

DETAILED DESCRIPTION OF THE INVENTION

Figure 1:
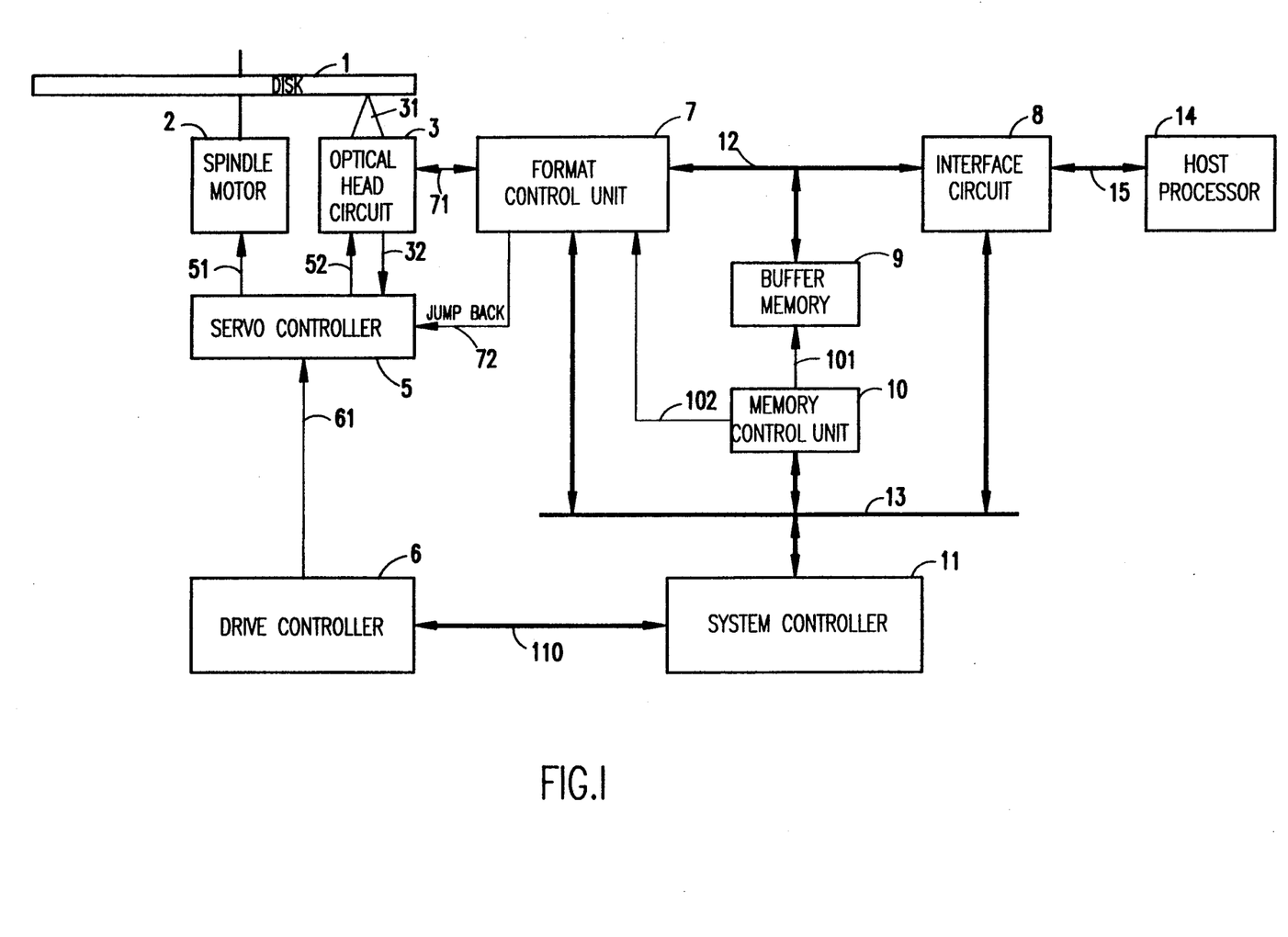
FIG. 1 is block diagram of a system employing a disk controller according to an embodiment of the present invention.

Referring now to FIG. 1, an optical disk controller according to an embodiment of the present invention includes an interface circuit 8 which receives and supplies commands and data from and to a host processor 14 via a system bus 15. The commands such as a data write command and a data read command from the host processor 14 are supplied to a system controller 11 via a controller bus 13. The system controller 11 responds to the commands thus supplied and calculates ID (Identification) information indicative of a physical address of a sector from which a data read/write operation starts and the number of sectors to be subjected to the data read/write and further generates seek information for moving rapidly an optical beam 31 to a target track on an optical disk 1. The seek information is supplied via a bus 110 to a drive controller 6, whereas read/write command information is supplied via a bus 13 to a format control unit 7 and a memory control unit 10. The data to be written into the disk 1, i.e. write data from the host processor 14, are temporarily stored into a buffer memory 9 through the interface circuit 8 and an internal bus 12. The buffer memory 9 is of a FIFO (first-in first-out) type. The data to be transferred to the host processor 14, i.e. read data derived from the disk 1, are also temporarily stored into the buffer memory 9 and then transferred to the host processor 14 through the interface circuit 8 and the system bus 15. The memory control unit 10 manages the buffer memory 9 through a control line 10 and thus detects the presence/absence of the write data into the memory 9 and the presence/absence of a vacancy for the read data in the memory 9. The detection output is outputted as ready information 102.

On the other hand, the disk 1 is rotated by a spindle motor 2 and the data read/write is carried out by an optical beam 31 from an optical head circuit 3. This circuit 3 produces focus and tracking information 32 for the beam 31, which information is in turn supplied to a servo controller 5. In response thereto, the controller 5 performs the rotation speed control of the motor 2 and the focus and tracking control of the beam 31 through control data 51 and 52. The servo controller 5 is further supplied with a seek control information and track jump information 61 from a drive controller 6. In response thereto, the servo controller 5 opens the servo control loop to move the beam 31 as the seek operation and the track jump operation.

The optical head circuit 3 communicates via a data line 71 with a format control unit 71 with respect to data to be recorded on the disk 1 and data reproduced from the disk 1. The format control unit 7 receives the write data from the buffer memory 9 in the data write mode and then supplies them to the head circuit 3 as data to be recorded. In the data read mode, on the other hand, it receives the data from the head circuit 3 and then supplies them to the buffer memory 9 as the read data. In accordance with the present invention, the format control unit 7 generates a jump back signal 72 by itself, and the jump back signal 72 is in turn supplied directly to the servo controller 5 without intervention of the system controller 11 and the drive controller 6.

Figure 2:
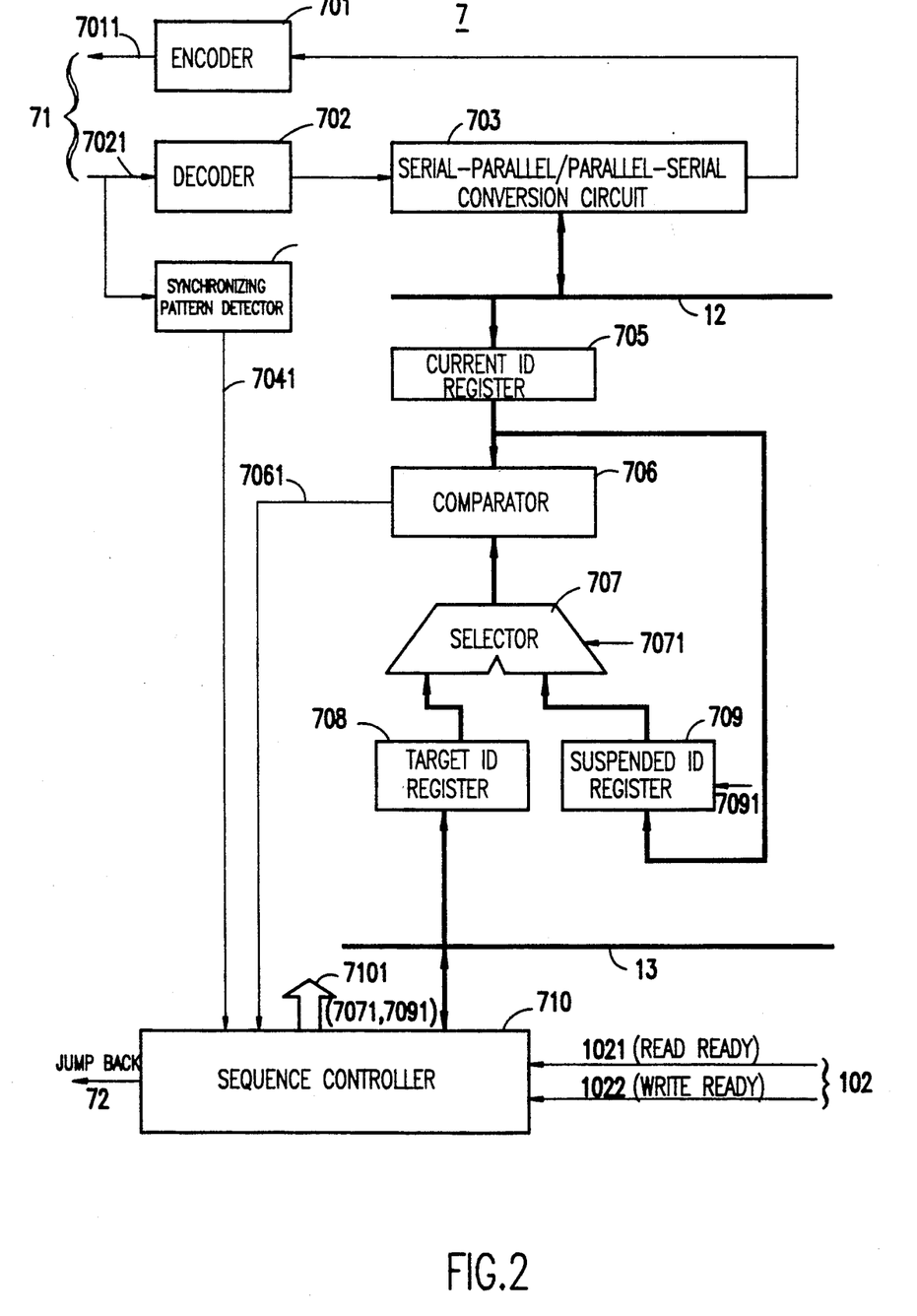
FIG. 2 is a block diagram representative of a format control unit shown in FIG. 1.

Turning to FIG. 2, the format control unit 7 includes a decoder 702 decoding or demodulating serial data 7021 which are supplied from the head circuit 3 as data recorded on the disk 1. The data derived from the decoder 702 is converted into parallel data by a serial-parallel/parallel-serial conversion circuit 703. The serial data are further supplied to a synchronizing pattern detector 704. This detector 704 detects predetermined patterns such as a sector mark indicative of the beginning of a sector, an address mark indicative of the beginning of ID information and a data mark indicative of the beginning of data and supplies this detection information to a sequence controller 710 via a bus 7041 to synchronize the controller 710. When ID information indicative of a current sector is obtained in the conversion circuit 702, it is transferred to a current ID register 705. The read-out data obtained in the circuit 703 in the data read mode is transferred to the buffer memory 9 via the bus 12. In the data write mode, on the other hand, the write data from the buffer memory 9 is transferred to the conversion circuit 703 and then converted into serial data which are in turn encoded or modulated by an encoder 701. Serial data 7011 to be recorded on the disk 1 are thus obtained and supplied to the head circuit 3.

ID information stored in the current ID register 703 is changed each time an accessible sector is changed. The ID information is compared by a comparator 706 with an output of a selector 707. This selector 707 selects and outputs the content of a target ID register 708 when a selection signal 7071 is at the low level. On the other hand, the high level of the signal 7071 causes the selector 707 to select and output the content of a suspended ID register 709. The target ID register 708 is loaded by the system controller 11 with ID information indicative of a sector from which data read/write operation starts. The suspended ID register 709 captures the content of the current ID register 705 in response to an ID fetch signal 7091.

The output 7061 of the comparator 706 is supplied to the sequence controller 710 which also receives a read ready signal 1021 and a write ready signal 1022 as data ready information 102 from the memory control unit 10. The sequence controller 710 responds to the synchronizing information 7041, the comparison output signal 7061, data ready information 102 and command information from the controller 11 and generates a set of sequence control signals 7101 for performing a sequence of operations. The sequence control signals 7101 contain the selection signal 7071 and ID fetch signal 7091. The controller 710 further generates the jump back signal 72 which is in turn supplied directly to the servo controller 5.

Figure 3:
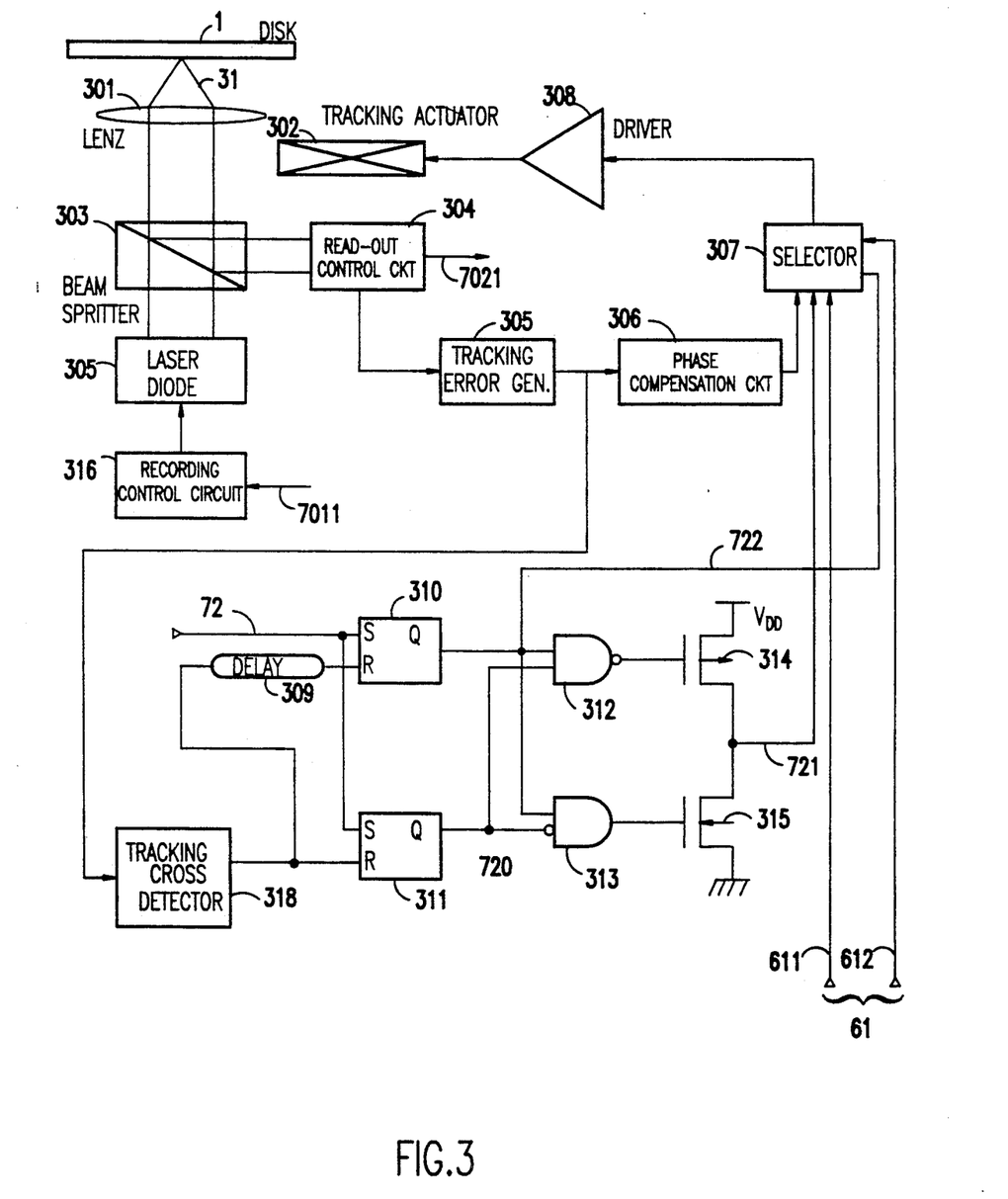
FIG. 3 is a block diagram representative of respective parts of an optical head circuit and a servo controller shown in FIG. 1.

Referring to FIG. 3, there is shown a tracking servo loop circuit and a jump back control circuit in the servo controller 5 and a part of the optical head circuit 3. A laser beam 31 from a laser diode 305 as an optical source is applied to the disk 1 through a beam splitter 303 and a lens 301. The laser beam reflected from the disk 1 is supplied to a read-out control circuit 304 by the beam spritter 303. The circuit 304 produces the serial data 7021 to be supplied to the format control unit 7. The circuit 304 further produces tracking information of the beam 31 and supplies it to a tracking error producing circuit 305 in which tracking error information is produced and then supplied through a phase compensation circuit 306, a selector 307 and a driver 308 to a tracking actuator 302 to carry out a tracking control. The circuit 306 compensates the phase delay of the actuator 302. The serial data 7011 to be recorded is supplied to a recording control circuit 316 to drive the laser diode 305.

The selector 307 receives the tracking error compensation signal from the circuit 306, a jump back drive signal 721 from a jump back circuit 720 and a seek drive signal 611 from the drive controller 6 and selects and outputs one of them in response to the levels of a jump back instruction signal 722 and a seek instruction signal 612. Specifically, when only the signal 722 takes the active level, the jump back drive signal 721 is selected and outputted. The seek drive signal 611 is selected when the signal 612 is at the active level. When both the signals 612 and 722 are at the inactive level, the tracking error compensation signal is selected.

The jump back circuit 720 includes two S-R type flip-flops 310 and 311, a NAND gate 312, an AND gate 313, a P-channel transistor 314, an N-channel transistor 315, a delay circuit 309 and a tracking cross detector 318 which are connected as shown. Accordingly, the jump back signal 72 from the sequence controller 710 of the format control unit 7 sets both flip-flops 310 and 311 to change the signal 722 to the active level and turn the transistor 314 ON. The tracking servo loop is thereby made open. The actuator 302 is driven by the $V_{DD}$ level, so that the laser beam 31 starts to move back to a track that is just before the current track. When the laser beam 31 crosses an intermediate point between two tracks, the detector 318 produces the detection output to reset the flip-flop 311. The transistor 314 is thereby turned OFF, whereas the transistor 315 is turned ON to stop the lens 301. The output of the detector 318 is delayed by a predetermined time by the delay circuit 309, and the delayed output resets the flip-flop 310. As a result, the tracking servo loop is formed again. The one-track jump back operation is thus completed.

Figure 4:
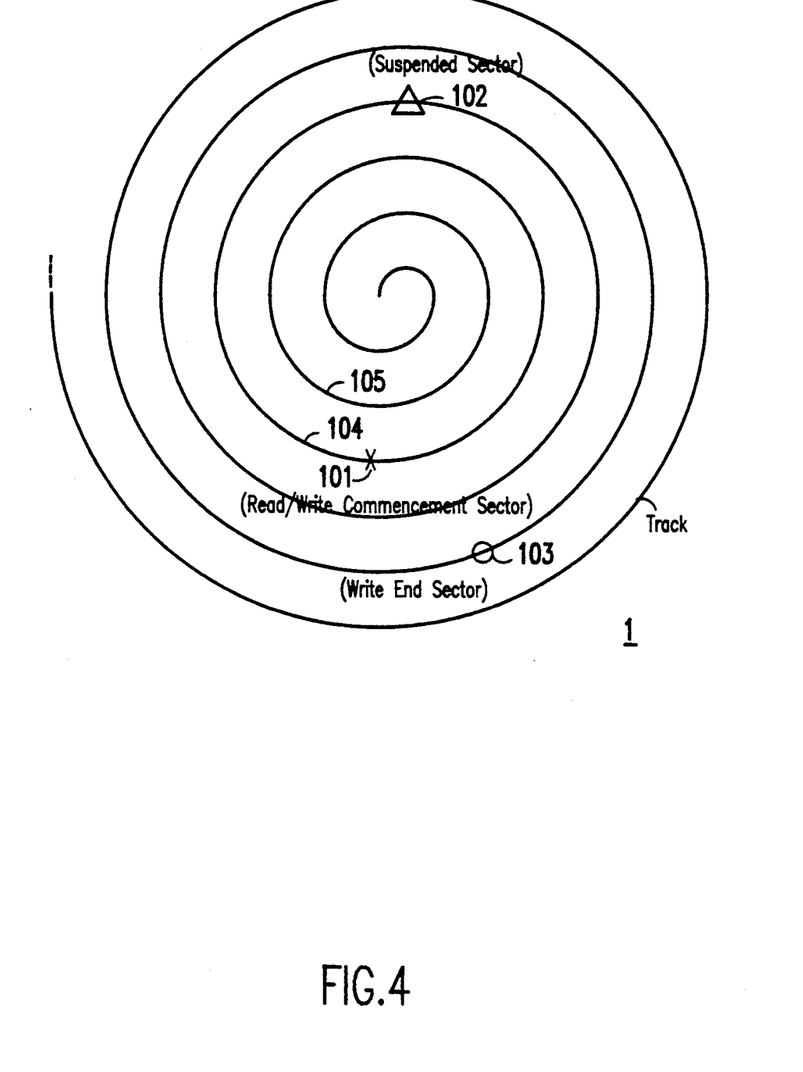
FIG. 4 is a diagram representative of a spiral track on an optical disk.

An operation will be described below with reference to FIGS. 1 to 3 and further to FIG. 4 illustrating the track configuration on the disk 1. When the host processor 14 issues data read/write command, the system controller 11 responds to command and produces and stores into the target ID register 708 ID information indicative of the physical address of a sector from which the data read/write operation starts, denoted by a read/write commencement sector 101 in FIG. 4. The system controller 11 further requests the sequence controller 710 to initiate a sequence flow for data read or write and supplies the drive controller 6 with seek information for moving the laser beam 31 to the neighborhood of the read/write commencement sector 101 by the seek operation. In response thereto, the drive controller 6 produces the seek drive signal 611 with making the signal 612 active, so that the laser beam 31 moves to the neighborhood of the sector 101. The signal 612 is thereafter changed to the inactive level to activate the tracking servo loop. The serial data 7021 from the readout control circuit 304 are thereby supplied to the decoder 702 and the synchronizing pattern detector 704. As described above, ID information to be stored in the current ID register 705 is changed each time the accessible sector varies. Since the selection signal 7071 is at the low level in an initial state, the content of the target ID register 708, i.e. the ID information of the data read/write commencement sector 101, is compared by the comparator 706 with the content of the current ID register 705.

When the comparator 706 produces the active level signal 7061 to inform that the read/write commencement sector 101 is accessible, the sequence controller 710 checks the level of data ready information 1021 before requesting the memory control unit 10 to transfer data between the buffer memory 9 and the conversion circuit 703. The write ready signal 1022 of the data ready information 102 is in the active level when write data is stored in the buffer memory 9 in the data write mode, and the read ready signal 1021 thereof is in the active level when the buffer memory 9 has a vacancy for accepting the read-out data in the data read mode. The sequence controller 710 monitors the ready signal 1021 or 1022 in accordance with the operation mode to be executed. When the monitored ready signal 1021 or 1022 is in the inactive level at a time the comparison output signal 7061 becomes active, the data read/write cannot be performed. Therefore, the sequence controller 710 generates the jump back signal 72. Consequently, as already described with reference to FIG. 3, the laser beam 31 jumps back to a track 105 that is just before a track 104 on which the read/write commencement sector 101 exists.

The sequence controller 710 further generates the ID fetch signal 7091, so that ID information of the read/write commencement sector 101 is stored in the suspended ID register 709 as a read/write-suspended sector information. The selection signal 7071 is thereafter changed to the high level to cause the selector 707 to select the register 709.

When the laser beam 31 shifts from the track 105 to the track 104 by the rotation of the disk 1 and the ID information of the sector 101 is then stored in the current ID register 705, the comparator 706 generates again the active level output signal 7061. Assuming that the write data is stored in the buffer memory 9 from the host processor 14 or the buffer memory 9 has a vacancy for accepting the read data before the active level signal 7061 is generated again, the monitored ready signal 1021 or 1022 is at the active level at a time the signal 7061 becomes active. Accordingly, the sequence controller 710 requests the data transfer of the memory control unit 10. In the data write mode, the write data is thereby transferred from the buffer memory 9 to the conversion circuit 703. In the data read mode, on the other hand, the read data is transferred from the conversion circuit 703 to the buffer memory 9.

If the monitored ready signal 1021 or 1022 is still at the inactive level when the signal 7061 comes active again, the jump back operation is repeated.

After the data read/write operation starts from the sector 101, the sequence controller 710 checks the monitored ready signal 1021 or 1022 irrespective of the level of the comparison signal 7061 each time the content of the current ID register 705 changes.

As denoted by a suspended sector 102 in FIG. 4, assume that the mentioned ready signal 1021 or 1022 is at the inactive level when the ID information indicative of the sector 102 is stored in the current ID register 705. The sequence controller 710 therefore generates the jump back signal 72 to back the track to be accessed by one. The ID information of the sector 102 is stored into the suspended ID register 709. After the jump back operation is completed, the content of the current ID register 705 changes in sequence. When the current ID register 705 stores the ID information indicative of the suspended sector 102, the comparison output signal 7061 becomes active. In response thereto, the sequence controller 710 requests again the jump back operation or requests the data transfer for the sector 102 in accordance with the monitored ready signal 1021 or 1022.

After the data read/write operation for the sector 102 is completed, the sequence controller 710 checks the ready signal 1021 or 1022 irrespective of the comparison output signal 7061 each time the content of the current ID register changes, as described hereinbefore.

Thus, the format control unit 7 detects whether or not the data read/write for the currently accessible sector is performed and then generates by itself, the jump back signal 72 when the data read/write is disabled. The jump back signal 72 controls directly the jump back circuit 720 to perform one-track jump back operation. Therefore, the access time is free from delay due to the response time of the system controller 11 and the drive controller 6. Moreover, the processing load of the system controller 6 is reduced.

The disk controller is required to execute a write-verify operation in which data from the host processor are recorded on the disk and thereafter the recorded data is read out and checked for errors. This operation is executed in general as follows.

That is, the format control unit informs the system controller of the completion of data recording. In response thereto, the system controller requests the seek operation of the drive controller to back the optical beam by a predetermined number of tracks. Thereafter, the format control unit receives a verifying command from the system control.

In such an operation, as shown in FIG. 4, if the data write commencement sector 101 is close to a data write end sector 103, while it is sufficient to back the beam 31 by two tracks, due to the delay of response time of the controllers 11 and 6, the beam 31 has already passed the write commencement sector 101 at the time the beam 31 is backed by two tracks. For this reason, the beam 31 requires to be backed by three tracks, resulting in that the initiation of the verifying operation is delayed.

Figure 5:
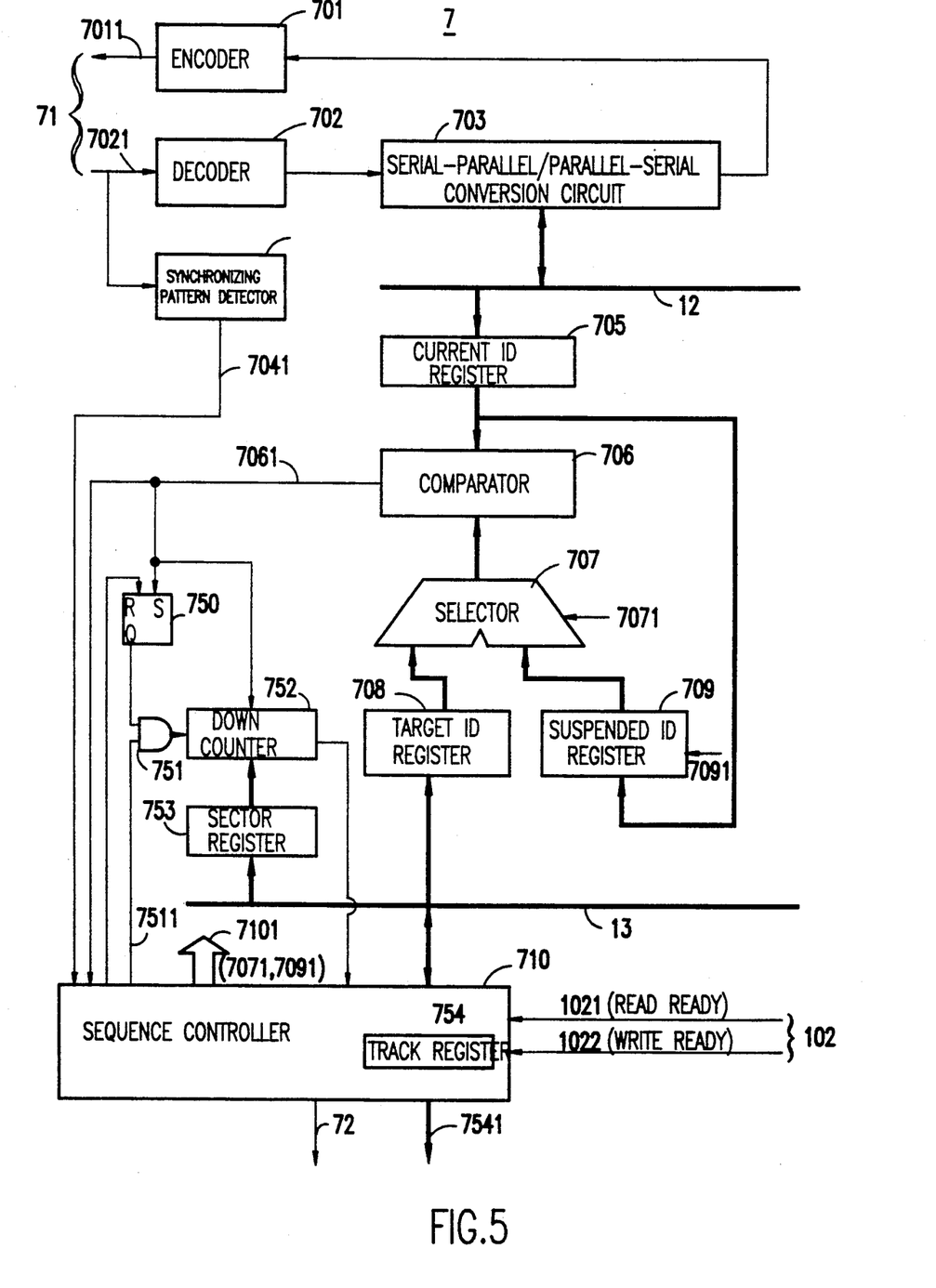
FIG. 5 is a block diagram representative of a format control unit according to another embodiment of the present invention.
Figure 6:
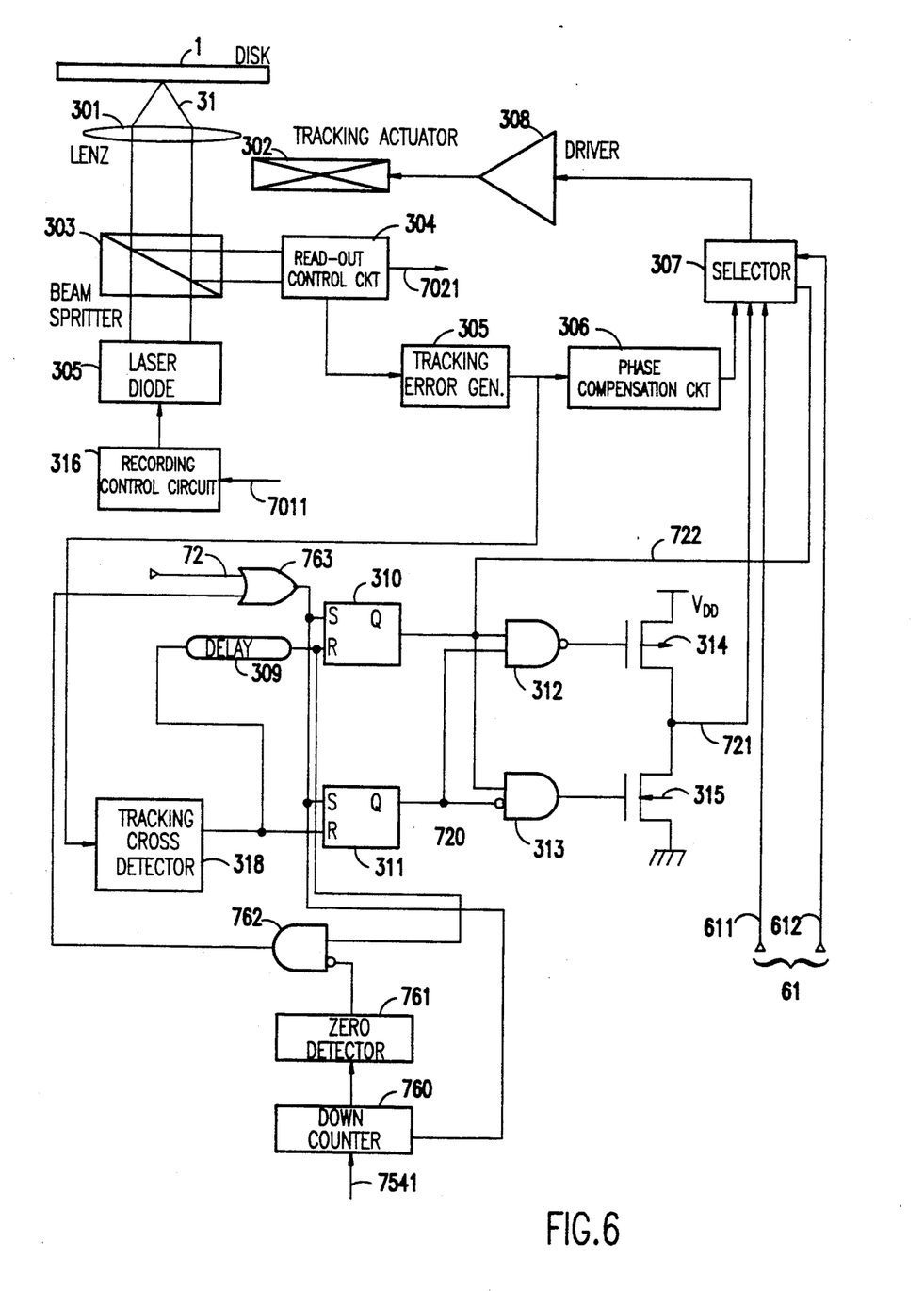
FIG. 6 is a block diagram representative of respective parts of an optical head circuit and a servo controller corresponding to the format control unit shown in FIG. 5.

A circuit construction for solving the above problem is shown in FIGS. 5 and 6 as another embodiment of the present invention, in which the same components as those shown in FIGS. 2 and 3 are denoted by the same reference numerals to omit further description thereof.

The format control unit according to the present embodiment further includes an S-R type flip-flop 750, an AND gate 751, a down counter 752 and a sector register 753, and a track register 754 is provided in the sequence controller 710. The sector register 753 is loaded with the number of sectors to be subjected to data recording from the system controller 11. The track register 754 is loaded with the number of tracks to be backed up ("2" in the example shown in FIG. 2) from the system controller 11.

The jump back operation which may be performed in the data write mode responsive to the write-verify operation is omitted because it is the same as the former embodiment.

By the generation of the comparison output signal 7061 due to the write commencement sector 101 becoming accessible, the flip-flop 750 is set to open the AND gate 751 and the content of the sector register 753 is loaded to the down counter 752. The sequence controller generates a count signal 7511 every time the write data is recorded on the sector, so that the content of the down counter 752 is decremented one by one. When the count value reaches zero, i.e. when the data write operation to the write end sector 103 is completed, the sequence controller 710 outputs the content, of the track register 754 onto the data line 7541 and thereafter generates the jump back signal 72.

Turning to FIG. 6, the jump back circuit 720 according to the present embodiment further includes a down counter 760, a zero detector 761, an AND gate 762 and an OR gate 763. The data on the line 7541 is loaded to the down counter 760. By the jump back signal 72 being thereafter generated, one-track jump back operation is executed and the content of the down counter 760 is decremented by one. The signal from the delay circuit 309 representative of the completion of one-track jump back operation passes through the AND gate 762 and then sets the flip-flops 310 and 311 as the jump back signal. The one-track jump back operation is thereby performed again. Since the content of the down counter 760 reaches zero, the detector 761 closes the AND gate 762. The output from the delay circuit 309 is thereby masked. Thus, the jump back operation for backing the beam 31 by two tracks is performed immediately. The comparator 706 thereafter generates the active level output signal 7061 for initiating the verifying operation.

It is apparent that the present invention is not limited to the above embodiments but may be modified and changed without departing from the scope and spirit of the invention. For example, in place of the selector 707, two comparators can be provided, one of which compares the current ID register with the target ID register and the other of which compares the current ID register with the suspended ID register, one of outputs of these comparator being selected. Moreover, a part of the buffer memory can be provided in the format control unit.

What is claimed is:

1. A disk controller for a disk having spirally formed tracks, comprising:

a buffer memory for temporarily storing write data to be recorded on said disk or read data derived from said disk, a first register for temporarily storing current sector information representative of a sector currently accessible, said current sector information being changed each time a currently accessible sector varies in accordance with rotation of said disk, a second register for temporarily storing target sector information representative of a sector from which a data read/write operation starts, comparator means for comparing said current sector information with said target sector information and for producing a coincident signal when said current sector information coincides with said target sector information, monitor means coupled to said buffer memory for producing a ready signal when said write data is stored in said buffer memory or when said buffer memory has a vacancy for accepting said read data, and control means coupled to said comparator means and said monitor means for generating a jump back signal when said coincident signal is produced while said ready signal is not being produced, said control means further generating said jump back signal when said monitor means stops producing said ready signal after said data read/write operation on said disk starts.

2. The disk controller as claimed in claim 1, further comprising:
   a third register loaded with the current sector information stored in said first register each time said jump back signal is generated, the current sector information stored in said first register being thereafter changed, and
   means for generating an additional coincident signal when the contents of said first and third registers become equal to each other, said control means generating said jump back signal again when said additional coincident signal is generated while said ready signal is not being produced.

3. The disk controller as claimed in claim 2, further comprising selector means responsive to said control means for selecting the contents of said second or third register for comparing with the contents of said first register, the contents of said first register being selected prior to said jump back signal being generated and the contents of said third register being selected after such time as said jump back signal is generated.

4. The disk controller as claimed in claim 2, wherein said disk controller performs a write-verify operation in which data written on the disk in response to a write command is thereafter read from the disk and the data read out is checked for errors, said control means comprising counter means for causing said jump back signal to be generated a number of times to return the read/write head to a track at which data recorded in response to said write command began to be recorded.

5. The disk controller as claimed in claim 4, wherein said counter means comprises:
   sector register means for temporarily storing a number corresponding to a number of sectors to be subjected to data recording in response to said write command;
   first down counter means initially loaded with the number temporarily stored in said sector register means for counting down to zero in response to data being recorded in a sector;
   track register means for temporarily storing a number corresponding to a number of tracks to be backed up upon completion of data recording for a write command; and
   second down counter means initially loaded with the number temporarily stored in said track register means for counting down to zero in response to said jump back signal being repeatedly generated.

6. In a disk controller for a disk having spirally formed tracks and driven by a servo controller which moves a read/write head to one of said tracks in response to control information supplied by a drive controller, said drive controller being responsive to seek information generated by a system controller from data read and write commands, said disk controller comprising:
   buffer memory means for temporarily storing write data to be recorded on said disk or read data derived from said disk,
   first register means for temporarily storing current sector information representative of a sector currently accessible, said current sector information being changed each time a currently accessible sector varies in accordance with rotation of said disk,
   second register means for temporarily storing target sector information representative of a sector from which a data read/write operation starts,
   comparator means for comparing said current sector information with said target sector information and for producing a coincident output signal taking an active level when said current sector information coincides with said target sector information,
   monitor means coupled to said buffer memory for producing a ready signal when said write data is stored in said buffer memory means or when said buffer memory means has a vacancy for accepting said read data, and
   control means coupled to said comparator means and said monitor means for generating a jump back signal when said coincident signal is produced while said ready signal is not being produced, said control means further generating said jump back signal when said monitor means stops producing said ready signal after said data read/write operation on said disk starts, said jump back signal being supplied directly to said servo controller without intervention of the system controller and the drive controller, said servo controller responding directly to the jump back signal to perform a jump back operation.

7. A disk controller for a disk apparatus which includes a disk having spirally formed tracks each containing a plurality of sectors, head circuit means for tracing each track to perform a data recording operation for recording write data supplied thereto to each sector or a data reading-out operation for reproducing read data from each sector, said head circuit means further producing current sector information indicative of a sector currently accessible and updating said current sector information each time the sector currently accessible varies, and a servo control unit for controlling, in response to a jump back signal supplied thereto, said head circuit means such that said head circuit means jumps back from a track currently being traced to a track precedent thereto, said disk controller comprising:
   a buffer memory means for temporarily storing said write data to be supplied to said head circuit means or said read data reproduced from each sector,
   a memory control unit coupled to said buffer memory for producing a ready signal when said write data is actually stored in said buffer memory or when said buffer memory has a vacancy for accepting said read data,
   a register for temporarily storing target sector information indicative of a target sector from which said data recording operation or said data reading-out operation starts, and
   a control circuit coupled to said head circuit means, said memory control unit and said register for allowing said head circuit means to start said data recording operation or said data reading-out operation when the current sector information from said head circuit means becomes equal to said target sector information while said ready signal is being produced and for generating and supplying said jump back signal to said servo control unit to thereby inhibit said head circuit means from starting said data recording operation or said data reading-out operation when the current sector information from said head circuit means becomes equal to said target sector information while said ready signal is not being produced.

8. The disk controller as claimed in claim 7, wherein said control circuit includes an additional register loaded with and temporarily storing the current sector information each time said head circuit means updates the current sector information and a comparator for comparing the current sector information stored in said additional register with said target sector information to detect that the current sector information becomes equal to said target sector information.

9. A disk controller for a disk apparatus which includes a disk having spirally formed tracks each containing a plurality of sectors, head circuit means for tracing each track to perform a data recording operation for recording write data supplied thereto on each sector or a data reading-out operation for reproducing read data from each sector, said head circuit means producing current sector information indicative of a sector currently accessible and updating said current sector information each time the sector currently accessible varies, and a servo control unit for controlling, in response to a jump back signal supplied thereto, said head circuit means such that said head circuit means jumps back from a track currently being traced to a track precedent thereto, said disk controller comprising:

a buffer memory for temporarily storing said write data to be supplied to said head circuit means or said read data reproduced from said disk, a memory control unit coupled to said buffer memory for producing a ready signal when said buffer memory actually stores said write data or when said buffer memory has a vacancy for accepting said read data, a register for temporarily storing suspended sector information indicative of a suspended sector at which said data recording operation or said data reading-out operation is suspended, and a control circuit coupled to said head circuit means, said memory control unit and said register for allowing said head circuit means to resume the suspended data recording operation or the suspended reading-out operation when the current sector information from said head circuit means becomes equal to said suspended sector information while said ready signal is being produced and for generating and supplying said jump back signal to said servo control means to thereby inhibit said head circuit means from resuming the suspended data recording operation or the suspended data reading-out operation when the current sector information from said head circuit mean becomes equal to said suspended sector information while said ready signal is not being produced.

10. The disk controller as claimed in claim 9, wherein said control circuit includes an additional register loaded with and temporarily storing the current sector information each time said head circuit means updates the current sector information and a comparator comparing the current sector information stored in said additional register with said suspended sector information to detect that the current sector information becomes equal to said suspended sector information.

* * * * *